(12) United States Patent
Suzuki et al.

(10) Patent No.: US 11,069,038 B2
(45) Date of Patent: Jul. 20, 2021

(54) INFORMATION PROCESSING APPARATUS, INFORMATION PROCESSING METHOD, AND IMAGE DISPLAY APPARATUS

(71) Applicant: SONY CORPORATION, Tokyo (JP)

(72) Inventors: Takaaki Suzuki, Tokyo (JP); Takahiro Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 15/558,324

(22) PCT Filed: Jan. 12, 2016

(86) PCT No.: PCT/JP2016/000113
§ 371 (c)(1),
(2) Date: Sep. 14, 2017

(87) PCT Pub. No.: WO2016/157671
PCT Pub. Date: Oct. 6, 2016

(65) Prior Publication Data
US 2018/0082406 A1    Mar. 22, 2018

(30) Foreign Application Priority Data

Mar. 27, 2015  (JP) ............................. JP2015-065963

(51) Int. Cl.
*G06T 5/00* (2006.01)
*G09G 3/00* (2006.01)
*H04N 9/31* (2006.01)

(52) U.S. Cl.
CPC ............. *G06T 5/003* (2013.01); *G09G 3/001* (2013.01); *H04N 9/317* (2013.01);
(Continued)

(58) Field of Classification Search
CPC .......... G06T 5/003; G06T 2207/20092; G06T 2200/24; H04N 9/3185; H04N 9/31; H04N 5/74; G09G 3/001
See application file for complete search history.

(56) References Cited

U.S. PATENT DOCUMENTS

2005/0190987 A1* 9/2005 Schulz ............... G02B 27/0988
382/291
2007/0286514 A1* 12/2007 Brown ................. H04N 9/3102
382/254
(Continued)

FOREIGN PATENT DOCUMENTS

CN    101364033 A    2/2009
CN    102714707 A    10/2012
(Continued)

OTHER PUBLICATIONS

International Search Report and Written Opinion of PCT Application No. PCT/JP2016/000113, dated Apr. 5, 2016, 10 pages of ISRWO.

*Primary Examiner* — Kee M Tung
*Assistant Examiner* — Khoa Vu
(74) *Attorney, Agent, or Firm* — Chip Law Group

(57) ABSTRACT

An information processing apparatus according to an embodiment of the present technology includes a projection instruction unit and an output unit. The projection instruction unit instructs a projection of a correction image in which one or more representative pixels are displayed. The output unit outputs a GUI (Graphical User Interface) for inputting a blur degree of each of the one or more representative pixels within the projected correction image.

14 Claims, 16 Drawing Sheets

(52) U.S. Cl.
CPC ....... *H04N 9/3179* (2013.01); *G06T 2200/24* (2013.01); *G06T 2207/20092* (2013.01)

(56) References Cited

U.S. PATENT DOCUMENTS

| | | | | |
|---|---|---|---|---|
| 2008/0117231 | A1* | 5/2008 | Kimpe | G09G 3/20 345/629 |
| 2009/0040398 | A1* | 2/2009 | Kasahara | H04N 5/142 348/759 |
| 2009/0244090 | A1* | 10/2009 | Zhang | G06K 9/2036 345/619 |
| 2012/0242911 | A1 | 9/2012 | Znamenskiy | |
| 2013/0071028 | A1* | 3/2013 | Schiller | G06T 7/11 382/180 |
| 2014/0333585 | A1* | 11/2014 | Suzuki | H04N 9/3194 345/175 |
| 2015/0269434 | A1* | 9/2015 | Aliaga | G06T 5/001 382/114 |
| 2015/0348239 | A1* | 12/2015 | Nestares | G06T 5/20 382/255 |
| 2016/0180503 | A1* | 6/2016 | Frascati | G06T 3/0093 345/646 |
| 2017/0318270 | A1* | 11/2017 | Fukuda | H04N 5/74 |

FOREIGN PATENT DOCUMENTS

| | | | |
|---|---|---|---|
| EP | 2026587 | A2 | 2/2009 |
| JP | 2006-174184 | A | 6/2006 |
| JP | 2008-131099 | A | 6/2008 |
| JP | 2009-042838 | A | 2/2009 |
| JP | 2009-524849 | A | 7/2009 |
| JP | 2013-516827 | A | 5/2013 |
| WO | 2007/087405 | A2 | 8/2007 |
| WO | 2011/083411 | A1 | 7/2011 |

* cited by examiner

INFORMATION PROCESSING APPARATUS, INFORMATION PROCESSING METHOD, AND IMAGE DISPLAY APPARATUS

CROSS REFERENCE TO RELATED APPLICATIONS

This application is a U.S. National Phase of International Patent Application No. PCT/JP2016/000113 filed on Jan. 12, 2016, which claims priority benefit of Japanese Patent Application No. JP 2015-065963 filed in the Japan Patent Office on Mar. 27, 2015. Each of the above-referenced applications is hereby incorporated herein by reference in its entirety.

TECHNICAL FIELD

The present technology relates to an image display apparatus such as a projector, an information processing apparatus that controls the image display apparatus, an information processing method, and a program.

BACKGROUND ART

From the past, image display apparatuses such as a projector are in wide use. For example, an image is displayed by modulating light from a light source by a light modulation device such as a liquid crystal device and projecting the modulated light onto a screen or the like. As the light modulation device, a reflection-type liquid crystal display device, a transmission-type liquid crystal device, a DMD (Digital Micromirror Device), or the like is used.

In a projector disclosed in Patent Literature 1, a technology for reducing image deterioration due to lowering of imaging performance in a projection optical system and generating a projection image close to input image information is disclosed. In this projector, inverse filter processing for compensating for projection image deterioration is executed using an MTF (Modulation Transfer Function)-lowering inverse filter of a projection lens. After that, judgment is made on whether a result of the inverse filter processing is within a range expressible by a light modulation unit for each predetermined pixel area. Then, image information of an unexpressible pixel area is restored to image information of the original image or changed to an expressible limit value. Accordingly, although the original image cannot be fully reproduced, a high-quality image can be projected (paragraphs [0026], [0031], [0035], etc. in specification of Patent Literature 1).

CITATION LIST

Patent Literature

Patent Literature 1: Japanese Patent Application Laid-open No. 2008-131099

DISCLOSURE OF INVENTION

Technical Problem

In projecting an image by the image display apparatus such as a projector in this way, it is important to prevent generation of a blur or the like due to performance of a projection optical system and the like. For example, a blur or the like may also be generated in an image to be projected due to a shape of a screen or the like on which the image is to be projected. A technology that prevents generation of such a blur and enables a high-quality image to be projected is being demanded.

In view of the circumstances as described above, the present technology aims at providing an information processing apparatus, an information processing method, a program, and an image display apparatus that enable a high-quality image to be projected.

Solution to Problem

To attain the object described above, an information processing apparatus according to an embodiment of the present technology includes a projection instruction unit and an output unit.

The projection instruction unit instructs a projection of a correction image in which one or more representative pixels are displayed.

The output unit outputs a GUI (Graphical User Interface) for inputting a blur degree of each of the one or more representative pixels within the projected correction image.

In this information processing apparatus, the blur degree of each of the representative pixels within the projected correction image is input by a user via the GUI. By correcting an image on the basis of the input blur degree, a high-quality image can be projected.

The information processing apparatus may further include a correction unit that corrects an image to be projected on the basis of the blur degree of each of the one or more representative pixels input via the GUI.

Accordingly, a high-quality image can be projected.

The information processing apparatus may further include a calculation unit that calculates a PSF (Point spread function) for each pixel of an image to be projected on the basis of the blur degree of each of the one or more representative pixels input via the GUI.

Accordingly, by executing inverse filter processing on an input image using the calculated PSF, a high-quality image can be projected.

The output unit may output a GUI capable of creating a shape that expresses the blur degree.

Accordingly, it becomes possible to project an unbroken image when seen from the user.

The calculation unit may calculate a PSF for the representative pixel on the basis of the shape expressing the input blur degree and a size of light spread from the representative pixel due to a blur.

Accordingly, it becomes possible to project an unbroken high-quality image when seen from the user.

The output unit may output a frame image indicating the size of light spread from the representative pixel due to the blur such that a shape that expresses the blur degree can be created in the frame image.

Accordingly, it becomes possible to omit an operation of inputting the size of light spread due to the blur and easily calculate the PSF.

The output unit may output a reference image indicating the representative pixel in which a blur is not caused in a state where a shape of the reference image is changeable.

Accordingly, it becomes possible to automatically calculate the size of light spread due to the blur and omit an operation of inputting the size with the size of the reference image being a reference.

The output unit may output a GUI for inputting the size of light spread from the representative pixel due to the blur.

Accordingly, a simple operation for the user is realized.

The information processing apparatus may further include a storage unit that stores a spot diagram of a projection apparatus that projects the correction image. In this case, the calculation unit may calculate the size of light spread from the representative pixel due to the blur on the basis of the stored spot diagram.

Accordingly, the PSF can be calculated with ease.

The output unit may output a plurality of candidate shape images to be candidates of the shape that expresses the blur degree.

Accordingly, the user can easily input the blur degree.

The output unit may output the plurality of candidate shape images in a state where each of the shapes is changeable.

Accordingly, an accuracy of the PSF calculation can be improved.

The projection instruction unit may instruct a projection of an image corrected on the basis of the PSF for each pixel that has been calculated by the calculation unit.

Accordingly, the user can input the blur degree while checking the projected image.

An information processing method according to an embodiment of the present technology is an information processing method executed by a computer, the method including instructing a projection of a correction image in which one or more representative pixels are displayed.

A GUI for inputting a blur degree of each of the one or more representative pixels within the projected correction image is output.

A program according to an embodiment of the present technology is a program that causes a computer to execute the following steps.

Step of instructing a projection of a correction image in which one or more representative pixels are displayed.

Step of outputting a GUI for inputting a blur degree of each of the one or more representative pixels within the projected correction image.

An image display apparatus according to an embodiment of the present technology includes an input unit, an image projection unit, a projection instruction unit, an output unit, and a correction unit.

Image information is input to the input unit.

The image projection unit is capable of generating and projecting an image on the basis of the image information.

The projection instruction unit causes the image projection unit to project a correction image in which one or more representative pixels are displayed.

The output unit outputs a GUI for inputting a blur degree of each of the one or more representative pixels within the projected correction image.

The correction unit corrects the input image information on the basis of the blur degree of each of the one or more representative pixels input via the GUI.

Advantageous Effects of Invention

As described above, according to the present technology, a high-quality image can be projected. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

First Embodiment (Image Display System)

Figure 1:
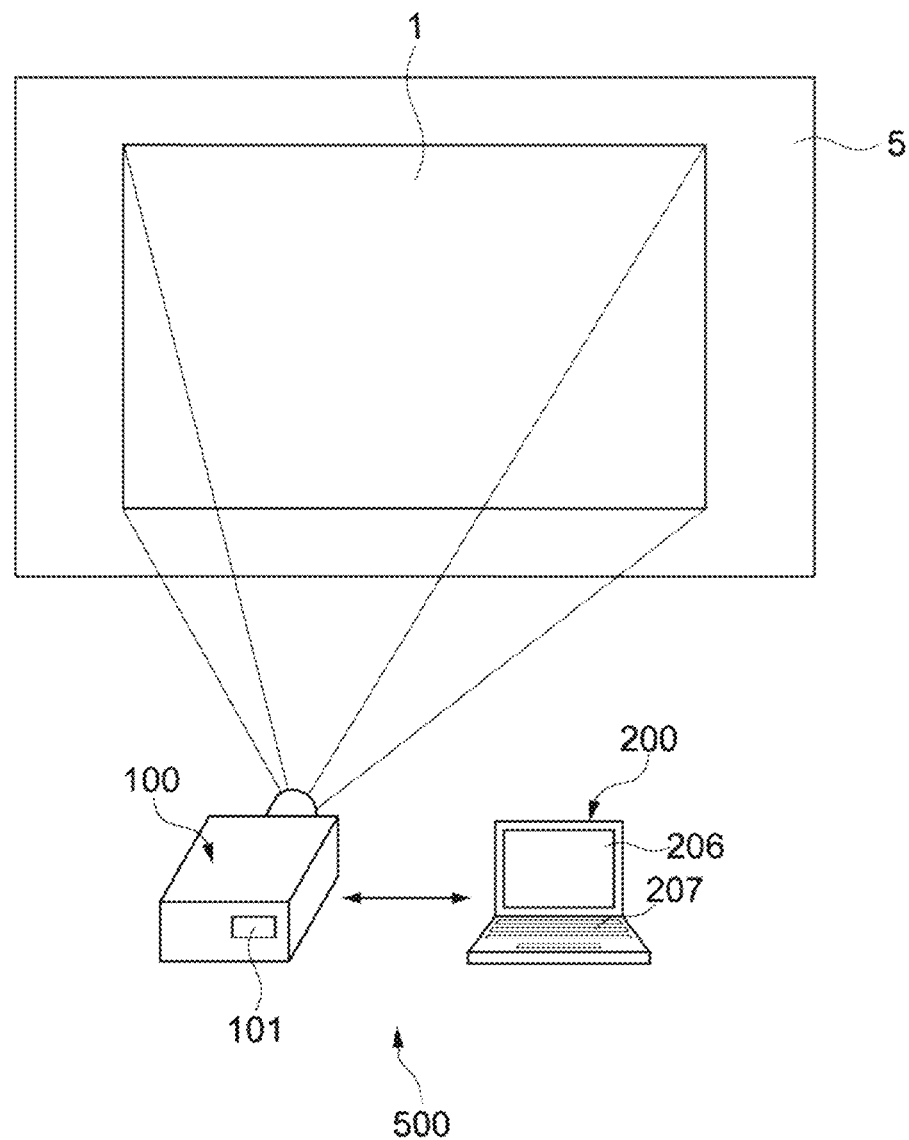
FIG. 1 A schematic diagram showing a configuration example of an image display system according to a first embodiment.

FIG. 1 is a schematic diagram showing a configuration example of an image display system according to a first embodiment of the present technology. An image display system 500 includes a projector 100 and a PC (Personal Computer) 200 that operates as an information processing apparatus according to the present technology. The projector 100 and the PC 200 are connected to each other, and operations of the projector 100 can be controlled by operating the PC 200.

The projector 100 is used as a projector for presentations or digital cinema, for example. The present technology is also applicable to projectors used for other purposes and image display apparatuses excluding the projector.

The projector 100 includes an input interface 101 equipped with an HDMI (registered trademark) (High-Definition Multimedia Interface) terminal and the like and a WiFi module and the like, for example. The PC 200 is connected to the input interface 101 via wires or wirelessly. Further, image information to be projected is input to the input interface 101 from an image supply source (not shown). It should be noted that the PC 200 may become the image supply source.

Figure 2:
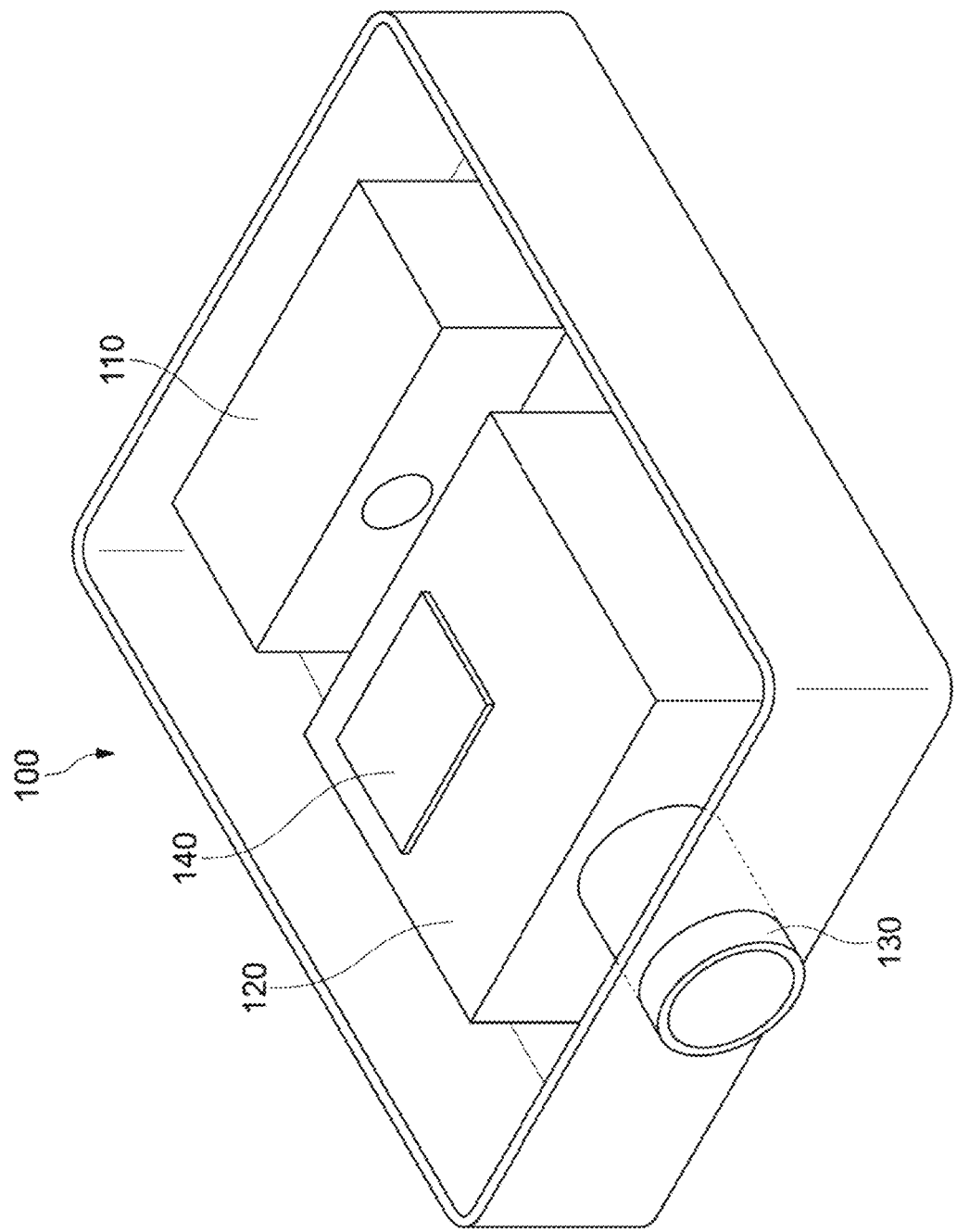
FIG. 2 A schematic diagram showing an internal configuration example of a projector.

FIG. 2 is a schematic diagram showing an internal configuration example of the projector 100. The projector 100 includes a light source unit 110, a light modulation unit 120, a projection unit 130, and a display control unit 140. The light source unit 110 typically generates white light and emits it to the light modulation unit 120. A solid-state light source such as an LED (Light Emitting Diode) and an LD (Laser Diode), a mercury lamp, a xenon lamp, or the like is arranged in the light source unit 110, for example.

The light modulation unit 120 generates an image 1 (see FIG. 1) by modulating light from the light source unit 110 on the basis of image information input to the input interface 101. The light modulation unit 120 includes, for example, an integrator device, a polarization conversion device, a split optical system that splits white light into light of 3 colors of RGB, 3 light modulation devices that modulate light of the respective colors, a synthesis optical system that synthesizes the modulated light of the respective colors, and the like. Specific configurations of these members and optical systems are not limited.

The projection unit 130 includes a plurality of lenses and projects the image 1 generated by the light modulation unit 120 onto a projection surface 5 (see FIG. 1) such as a screen. The configuration of the projection unit 130 is not limited, and an arbitrary configuration may be adopted as appropriate. In this embodiment, an image projection unit is realized by the light source unit 110, the light modulation unit 120, and the projection unit 130.

The display control unit 140 controls operations of respective mechanisms of the image display apparatus 100. The display control unit 140 also executes various types of processing on the image information input from the input interface 101. For example, the display control unit 140 is capable of correcting the input image information. The configuration of the display control unit 140 is not limited, and arbitrary hardware and software may be used as appropriate.

Figure 3:
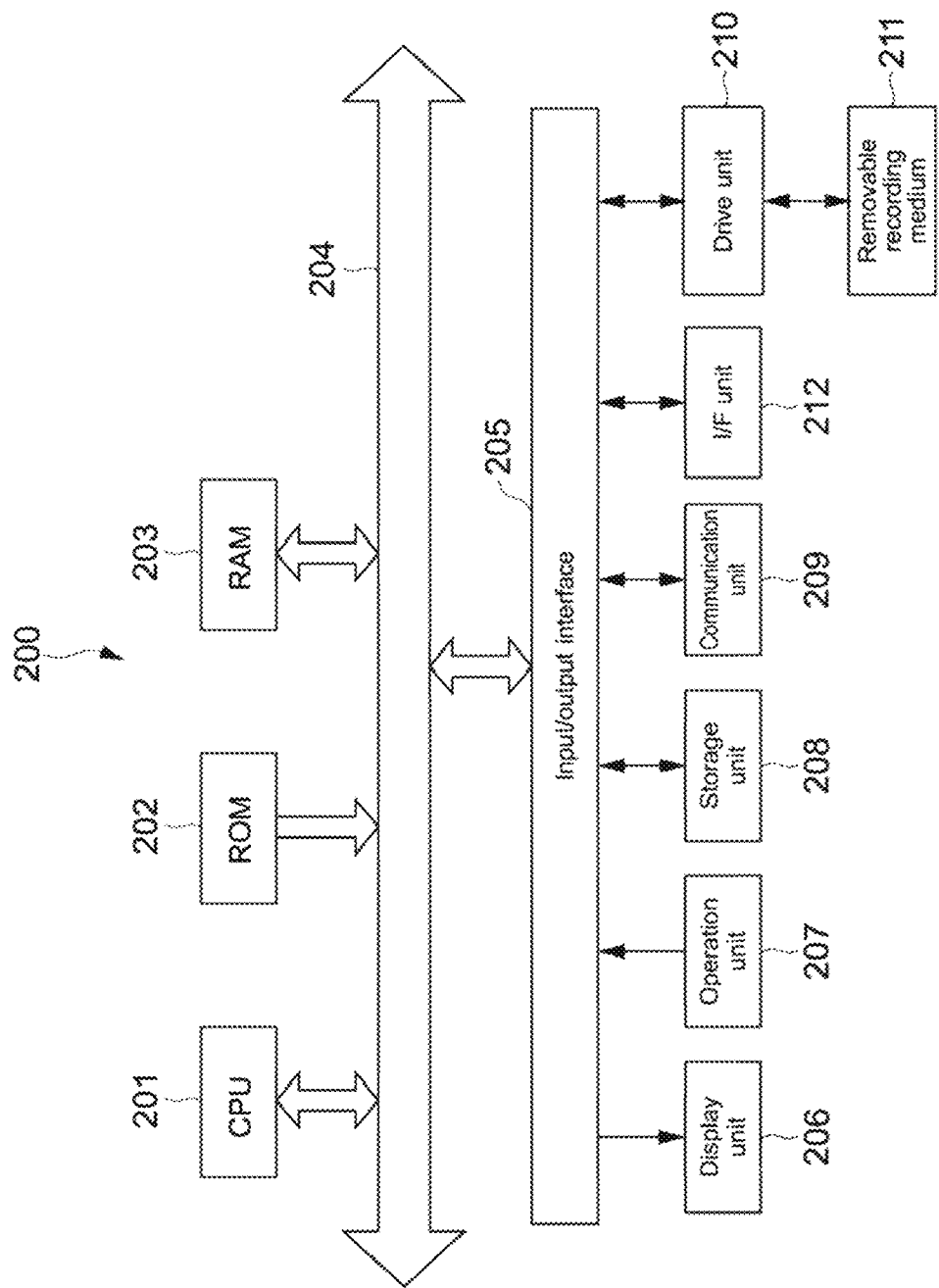
FIG. 3 A schematic block diagram showing a configuration example of a PC.

FIG. 3 is a schematic block diagram showing a configuration example of the PC 200. The PC 200 includes a CPU (Central Processing Unit) 201, a ROM (Read Only Memory) 202, a RAM (Random Access Memory) 203, an input/output interface 205, and a bus 204 that mutually connects them.

A display unit 206, an operation unit 207, a storage unit 208, a communication unit 209, a drive unit 210, an I/F (interface) unit 212, and the like are connected to the input/output interface 205.

The display unit 206 is a display device that uses liquid crystal, EL (Electro-Luminescence), or the like, for example. The operation unit 207 is, for example, a keyboard, a pointing device, or other operation apparatuses. In a case where the operation unit 207 includes a touch panel, the touch panel may be integrated with the display unit 206.

The storage unit 208 is a nonvolatile storage device such as an HDD (Hard Disk Drive), a flash memory, and other solid-state memories, for example. The drive unit 210 is a device capable of driving a removable recording medium 211 such as an optical recording medium, for example.

The communication unit 209 is a communication apparatus that is connectable with a LAN (Local Area Network), a WAN (Wide Area Network), and the like and used for communicating with other devices. The communication unit 209 may perform either wired communication or wireless communication.

The I/F unit 212 is an interface for connecting other devices and various cables, such as a USB (Universal Serial Bus) terminal, an HDMI (registered trademark) (High-Definition Multimedia Interface) terminal, and a network terminal.

Information processing carried out by the PC 200 is realized by software stored in the storage unit 208, the ROM 202, or the like in cooperation with hardware resources of the PC 200. Specifically, the information processing is realized by the CPU 201 loading a program configuring software, that is stored in the storage unit 208 or the like, in the RAM 203 and executing it.

In this embodiment, a projection instruction unit, an output unit, a correction unit, and a calculation unit are realized by the CPU 201 executing a predetermined program. Dedicated hardware may be used for realizing these blocks.

The program may be installed in the PC 200 via, for example, the recording medium 211 or may be installed via a global network or the like. It should be noted that the information processing apparatus according to the present technology is not limited to the PC 200 described above, and various computers may be used.

(Projection Image Correction Method)

For example, deterioration such as a blur may be caused in the projected image 1 due to performance of optical devices such as a lens and a mirror arranged in the light modulation unit 120 and the projection unit 130, a shape of the projection surface 5 on which the image 1 is displayed, and the like. For correcting this deterioration such as a blur, in this embodiment, a PSF (Point spread function) is calculated for each pixel of the projection image 1 by the PC 200. Then, an inverse filter calculation is executed using the calculated PSF.

Figure 4:
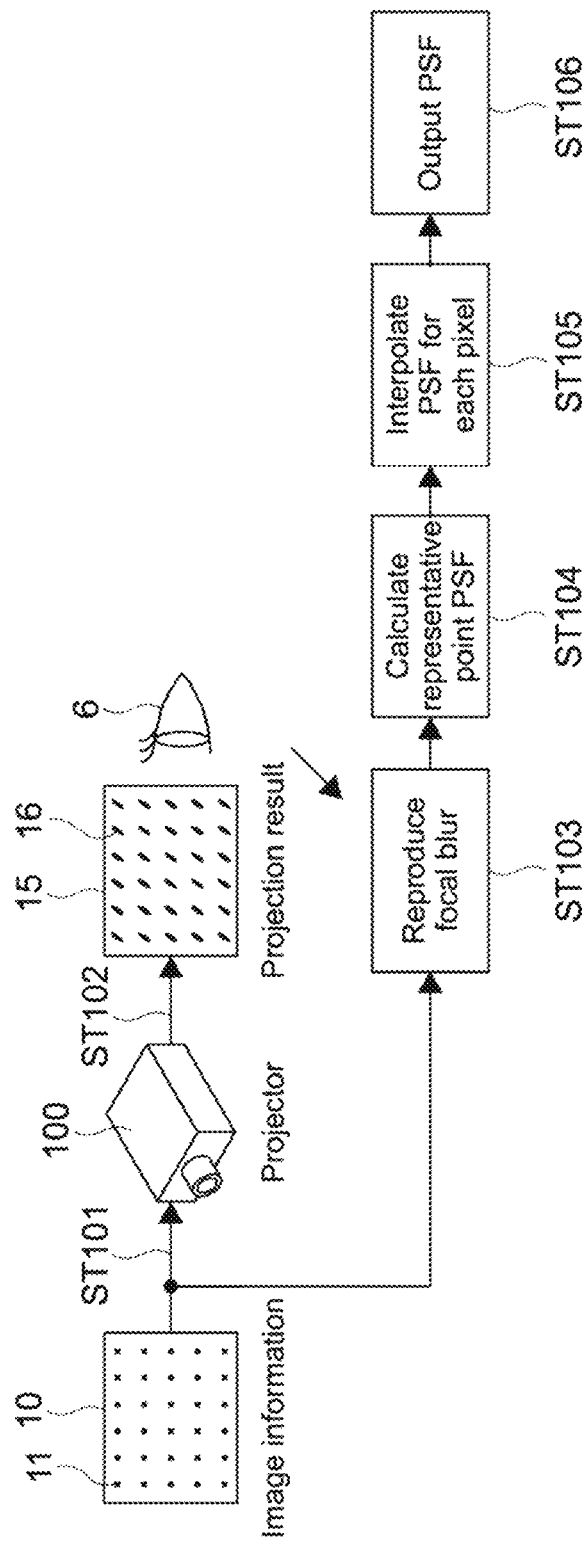
FIG. 4 A block diagram showing a general outline of a PSF calculation according to the first embodiment.

FIG. 4 is a block diagram showing a general outline of a PSF calculation according to this embodiment. First, the CPU 201 that functions as the projection instruction unit instructs the projector 100 to project a correction image 10 (Step 101). The instructed projector 100 projects a correction image 15 (Step 102). The projected correction image 15 is an image including the deterioration such as a blur described above. It should be noted that the reference numeral of the correction image will be distinguished between image information and a projection image.

A user 6 visually checks the correction image 15 projected onto the projection surface 5, and a focal blur generated in the correction image 15 is reproduced. The reproduction of a focal blur corresponds to an input of a blur degree (Step 103). Although descriptions will be given later in detail, the focal blur is reproduced for each representative point (representative pixel) 16 in the correction image 15.

On the basis of the reproduced focal blur, the CPU 201 that functions as the calculation unit calculates a PSF for each representative point 16 (Step 104). On the basis of the PSF of each representative point 16, PSFs of pixels other than the representative points 16 are calculated by interpolation (Step 105). As a result, the PSF is calculated for each of the pixels of the projection image 1 projected by the projector 100 (Step 106).

By the user 6 visually checking a blur in the correction image 15 projected in this way and the user 6 him/herself inputting a degree of the blur, it becomes possible to project an image 1 whose blur is corrected highly accurately and that does not cause the user 6 to feel a feeling of strangeness in a visual sense.

For example, in a case of photographing the projected correction image 15 and automatically calculating a PSF or a case of automatically calculating a PSF on the basis of a design value of the projector 100, a part that is apparently unnatural when seen from the user 6 or a part where an image is broken may be caused. Further, in a case of actually measuring a PSF by photographing with a camera, a PSF estimation accuracy may be lowered due to aberrations, noises, and the like of a camera lens. Furthermore, in the case of calculating a PSF using a design value, it is difficult to correct a blur or the like due to characteristics on the projection surface 5 side, such as a shape and material of a screen used for a projection.

By the PSF calculation method according to the present technology, it becomes possible to solve the problems as described above and project a high-quality image. Moreover, since a complex and expensive automatic detection system including a camera and the like becomes unnecessary, costs can be reduced. Hereinafter, the PSF calculation according to the present technology will be described in detail.

Figure 5:
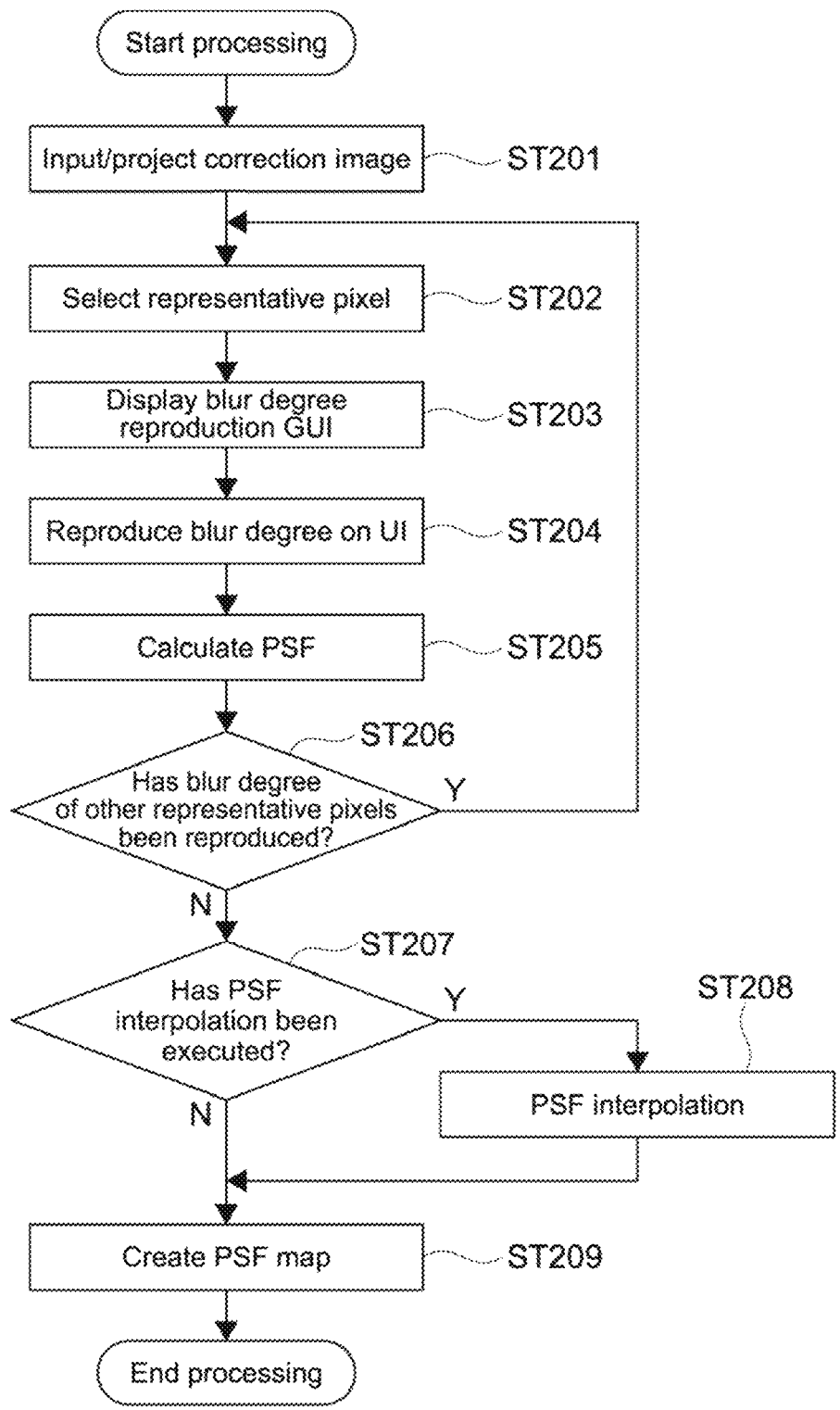
FIG. 5 A flowchart showing a specific PSF calculation example.
Figure 6:
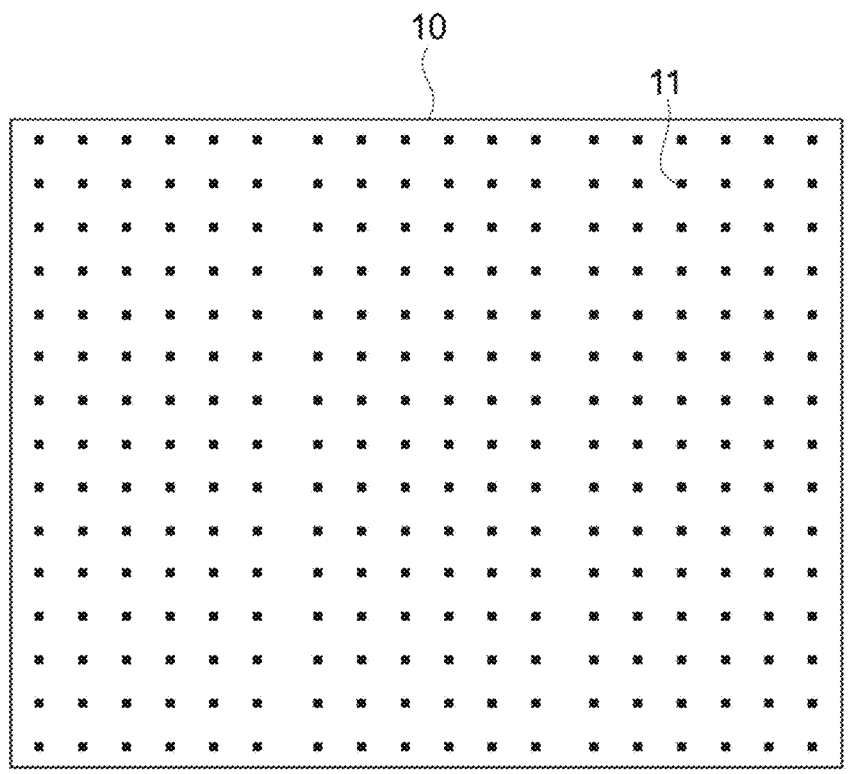
FIG. 6 A schematic diagram showing a configuration example of a correction image to be input.
Figure 7:
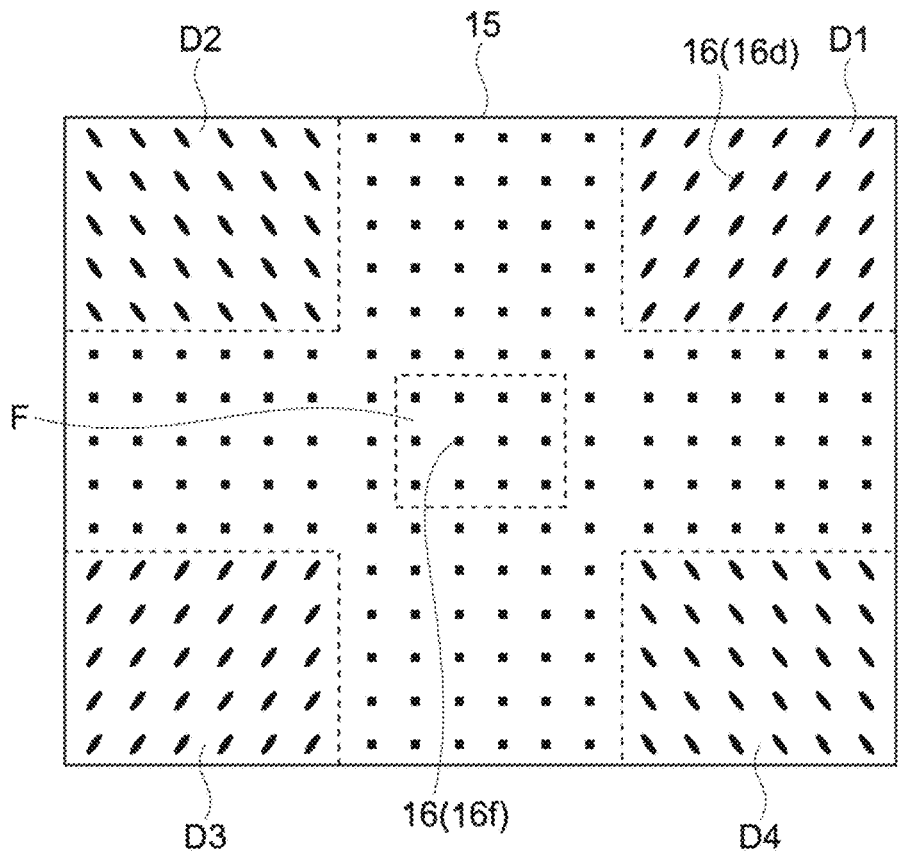
FIG. 7 A schematic diagram showing the correction image projected by the projector.

FIG. 5 is a flowchart showing a specific PSF calculation example. First, a correction image 10 is input to the projector 100 and projected (Step 201). FIG. 6 is a schematic diagram showing a configuration example of the correction image 10 to be input. FIG. 7 is a schematic diagram showing the correction image 15 projected by the projector 100.

As shown in FIG. 6, the correction image 10 is an image in which a single pixel (1 dot) is arranged longitudinally and laterally at predetermined intervals. These plurality of singularly-arranged pixels become one or more representative pixels 11 according to this embodiment. The number of representative pixels 11, the size of intervals in the longitudinal and lateral directions, and the like are not limited. The representative pixel 11 is a pixel to become a target for calculating a PSF that expresses light spread of each pixel.

Pixel values to be set for the representative pixels 11 in the correction image 10 are not limited. For example, a defined maximum value of a pixel value (255 for 8 bits, and 1023 for 10 bits) is set as the pixel values of the representative pixels 11. Accordingly, it becomes easy to visually grasp a blur degree of the representative pixels 16 (see FIG. 7) to be projected. Of course, other pixel values may also be set. It should be noted that the correction image 10 including one or more representative pixels 11 is also referred to as 1-dot pattern image.

As shown in FIG. 7, a blur is caused in the projected correction image 15. Particularly in this embodiment, the representative pixels 16d in areas D1-D4 at four corners of the correction image 15 are displayed in a blur. In other words, the areas D1-D4 become defocus areas (hereinafter, referred to as defocus areas D1-D4 using same symbol).

On the other hand, in projecting an image, the image is focused with at least a partial area being a reference by autofocus, manual operations, and the like. Therefore, regarding the predetermined area, the representative pixels 16 are displayed substantially without a blur. In this embodiment, a center area becomes a focus area that is being focused. Therefore, the representative pixels 16f in the focus area F are pixels that are projected substantially without a blur. The positions and the like of the focus area F and defocus area D are not limited and depend on the shape of the projection surface 5 and the like.

Referring back to FIG. 5, the representative pixels 16 for which a PSF is to be calculated are selected by the user 6 (Step 202). Therefore, the PC 200 causes the display unit 206 to display a text image for explaining a selection operation or causes the projector 100 to project a pointer for selecting the representative pixels 16, and the like, for example. The user 6 selects the representative pixels 16 by operating the operation unit 207 of the PC 200. Here, it is assumed that the representative pixels 16d in the upper-right defocus area D1 have been selected.

By the CPU 201 functioning as the output unit, a GUI for reproducing a blur degree is displayed on the display unit 206 (Step 203). Specifically, a GUI for inputting a blur degree of each of the one or more representative pixels 16 in the projected correction image 15 is output.

Figure 8:
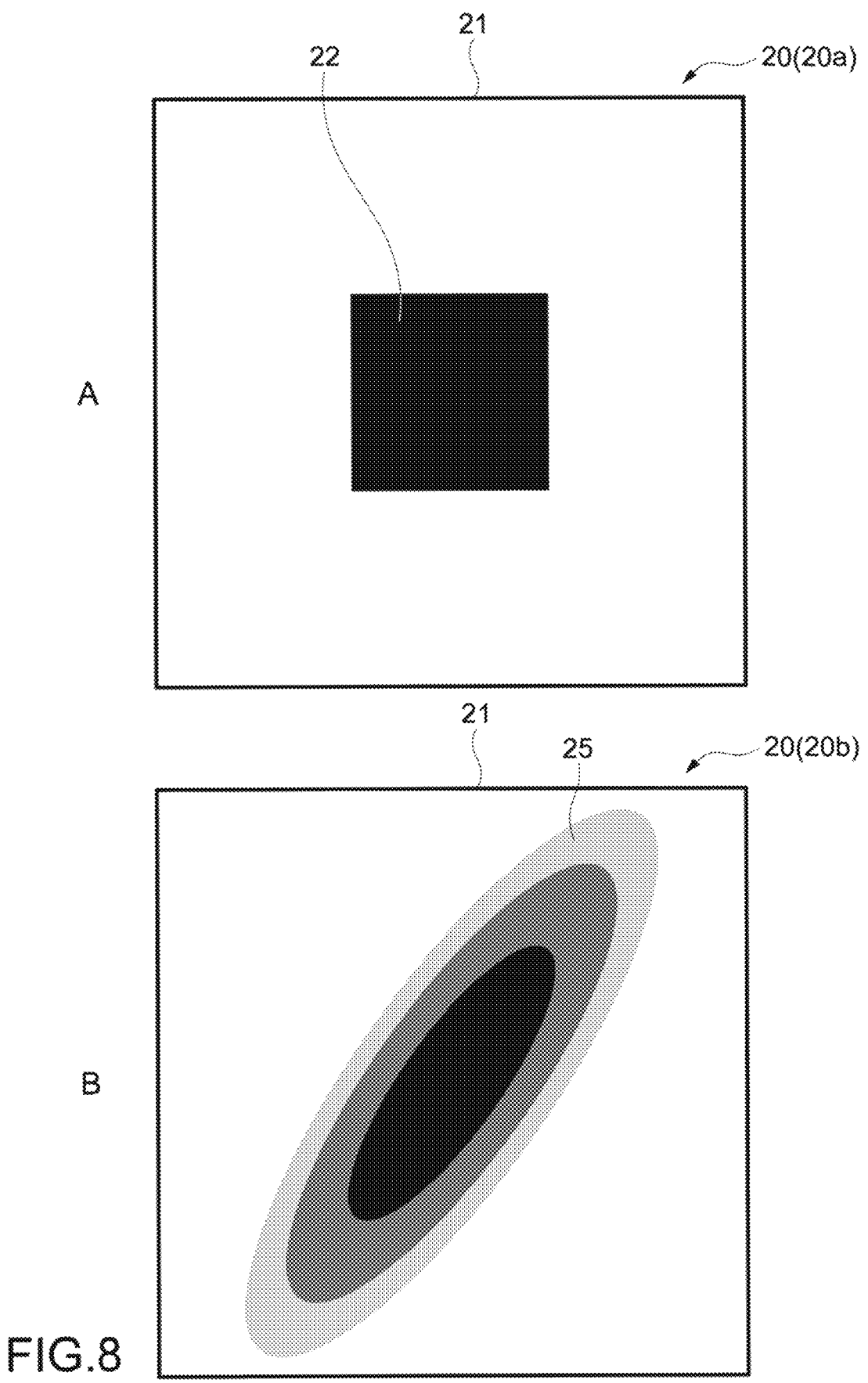
FIGS. 8A and 8B Schematic diagrams each showing a configuration example of a GUI for reproducing a blur degree.

FIGS. 8A and 8B are schematic diagrams each showing a configuration example of the blur degree reproduction GUI. In this embodiment, a GUI 20 capable of creating a shape that expresses a blur degree (hereinafter, referred to as blur shape) is displayed as the blur degree reproduction GUI. FIG. 8A is a GUI 20a before the shape is created by the user 6. FIG. 8B is a GUI 20b after the shape is created by the user 6.

The GUI 20a shown in FIG. 8A includes a frame image 21 of a predetermined size and a reference image 22 that is arranged in the frame image 21 and becomes a reference for the shape creation. The frame image 21 is displayed as an image in which a blur shape can be created. The reference image 22 is arranged at the center of the frame image 21 and displayed with a maximum pixel value, for example. The user 6 reproduces the shape of the representative pixel 16d by deforming the shape of the reference image 22.

The representative pixels 16d in the defocus area D1 of FIG. 7 are displayed while spreading ovally with a rightward diagonal direction being a long-axis direction. This shape corresponds to the shape of light spreading from the representative pixel 16d, and this shape is created as a blur shape 25 as shown in FIG. 8B (Step 204).

As the blur shape 25, it is also possible to partially change the pixel values in the shape 25. For example, it is assumed that, when visually checking the representative pixel 16d in the correction image 15, optical luminance is lowered from the center of the representative pixel 16d toward an edge thereof. In this case, the lowering of optical luminance can be reproduced by lowering the pixel values of the area stepwise from the center of the blur shape 25 toward an edge thereof. In FIG. 8B, a part with low pixel values is illustrated in gray.

Colors of the frame image 21 and the reference image 22 are not limited. For example, in a case where the PSF calculation according to the present technology is executed while separating in 3 colors of RGB, the frame image 21 and the reference image 22 are displayed in calculation target colors. It should be noted that a highly-accurate correction becomes possible by calculating a PSF for each color, and on the other hand, processing can be simplified in a case of calculating a PSF representatively in one color.

The technology for reproducing the blur shape 25 on a UI in this way is not limited, and an arbitrary technology may be used. For example, by using a well-known drawing technology or the like, creation of the blur shape 25 can be realized. Further, text information or the like for explaining each operation for creating the blur shape 25 to the user 6 or prompting the user 6 to perform the operations may be displayed as appropriate. Hereinafter, descriptions on such display of text information or the like may be omitted.

Figure 9:
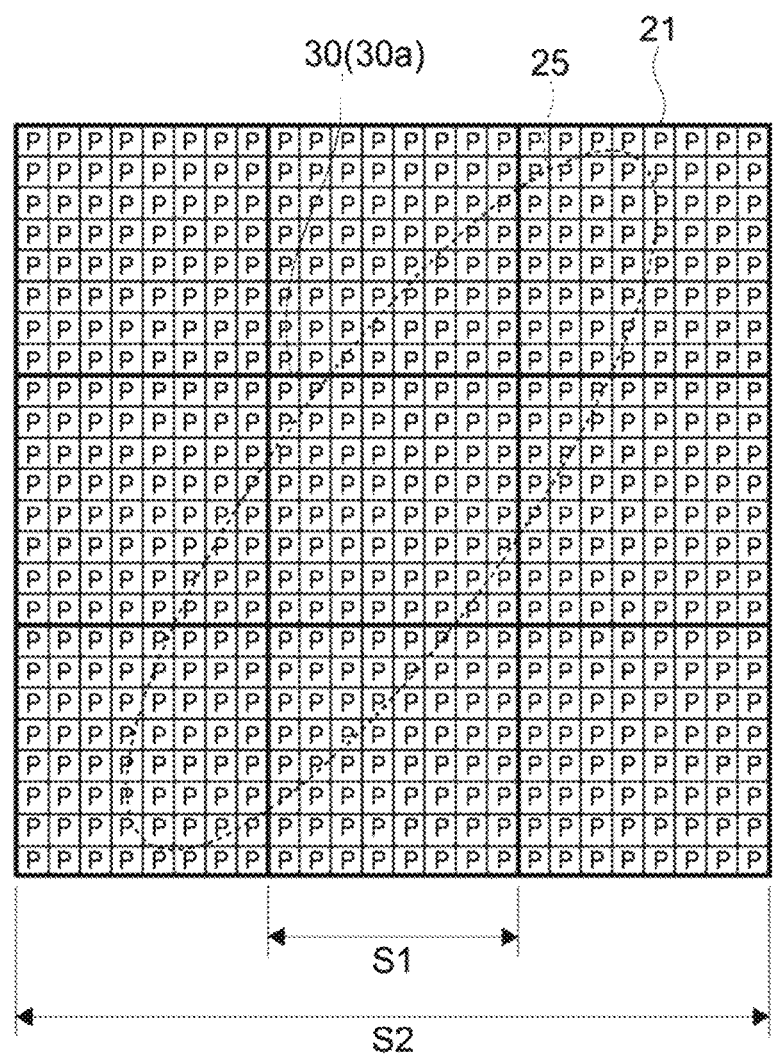
FIG. 9 A diagram for explaining a PSF calculation example based on a created blur shape.
Figure 10:
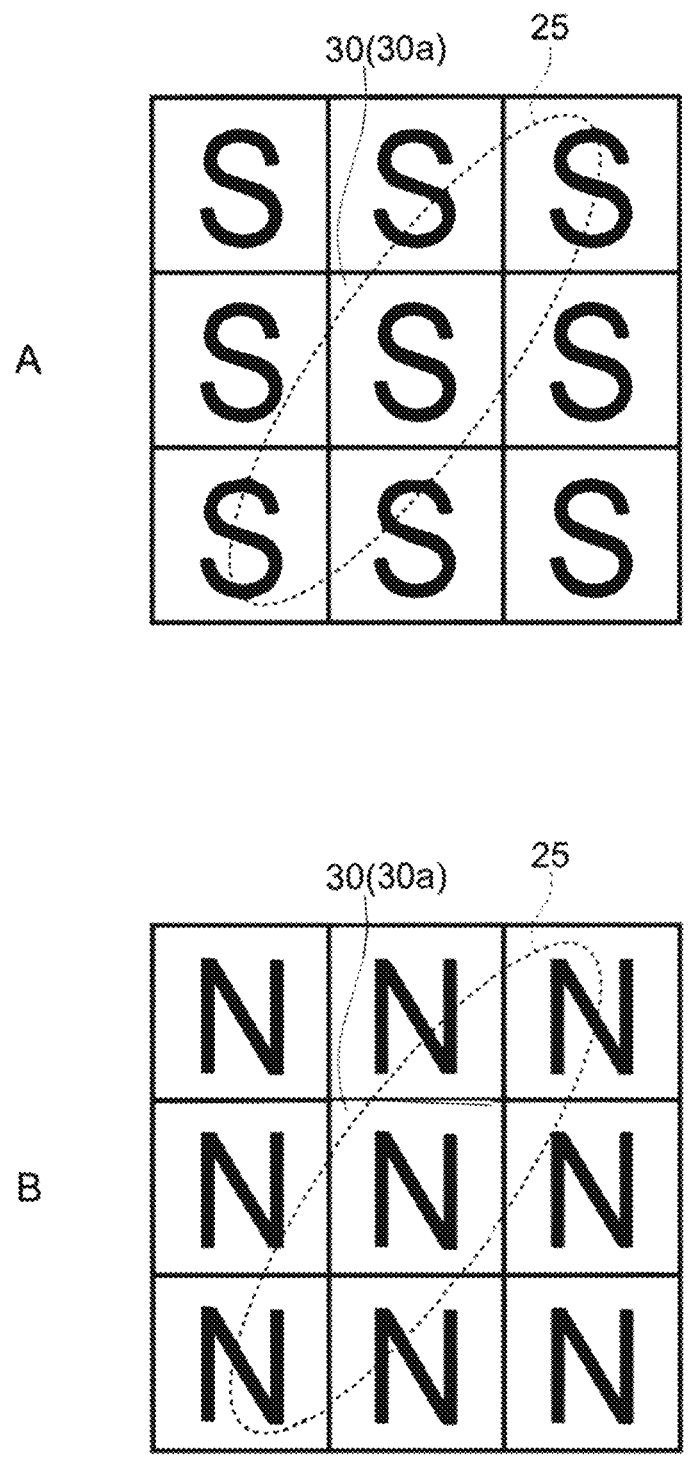
FIGS. 10A and 10B Diagrams for explaining the PSF calculation example based on the created blur shape.

As the blur shape 25 is created and the user 6 determines it, a PSF for the representative pixels 16d is calculated on the basis of the blur shape 25 (Step 205). FIGS. 9 and 10 are diagrams for explaining the PSF calculation example based on the created blur shape 25. It should be noted that in FIGS. 9 and 10, the blur shape 25 is illustrated in a broken line to help understand the figure.

As shown in FIG. 9, an area of the frame image 21 is divided by a size S1 of the representative pixel 16d in a state where a blur is not caused. This size S1 is a size of light spread in a case where a blur is not caused in the representative pixel 16f. Hereinafter, the representative pixel 16d in a state where a blur is not caused may simply be referred to as blur-less representative pixel 16d. The size S1 can be calculated on the basis of a size of light spread from the representative pixel 16d due to a blur, that is, a blur size S2.

For example, it is assumed that light from the representative pixels 16d is spread across 3 pixels in each of the longitudinal direction and the lateral direction, and the blur size S2 is "3 pixels in longitudinal and lateral directions". In this case, the area of the frame image 21 is equally divided into 9 so as to obtain areas corresponding to 3 pixels in the longitudinal and lateral directions. Assuming that the divided areas each corresponding to 8*8 pixels are representative pixel areas 30, the size of the representative pixel areas 30 becomes the size S1 of the blur-less representative pixel 16d. It should be noted that the representative pixel area 30a at the center becomes a display area of the blur-less representative pixel 16d. In other words, a blur that centers on the representative pixel area 30a is caused.

The method of acquiring the blur size S2 will be described later in detail.

As shown in FIG. 10A, pixel values P of 64 pixels within each of the representative pixel areas 30 are added, and a sum value S is calculated for each of the representative pixel areas 30. By normalizing the sum value S, a normalization value N is calculated for each of the representative pixel areas 30 as shown in FIG. 10B. This normalization value N is output as the PSF for the representative pixel 16d. In other words, the PSF for the representative pixel 16d is calculated on the basis of the blur shape 25 shown in FIG. 8B and the blur size S2.

As a method for the PC 200 to acquire the blur size S2, there are several embodiments. For example, the blur size S2 may be input by the user 6 via the operation unit 207. The user 6 visually compares the representative pixels 16f in the focus area F of the projected correction image 15 and the representative pixels 16d in the defocus area D. Then, with the size of the representative pixels 16f being a reference, the size of light spread from the representative pixels 16d is grasped. The size is input to the PC 200 as the blur size S2. It should be noted that a GUI for inputting the blur size S2 may be set arbitrarily.

It is also possible for a spot diagram of the projector 100 to be stored in the storage unit 208 or the like so that the blur size S2 is automatically calculated by the spot diagram. The spot diagram is obtained by plotting a point where a light beam intersects an evaluation surface and is information that enables image features (e.g., how flare appears) to be evaluated.

By the spot diagram, it becomes possible to acquire a spot shape of the image projected by the projector 100, at respective positions on the projection surface 5. On the basis of a ratio of a spot size of a focus point that is being focused in the spot diagram and a spot size of a blur reproduction target point, the blur size S2 of the blur reproduction target point can be calculated. It should be noted that the spot size is, for example, RMS (expresses sum of squares of difference between barycentric position and position of each point by 100% (unit: mm)), though of course not limited thereto.

By using the spot diagram, it becomes possible to easily acquire the blur size S2, simplify processing, and shorten a processing time. On the other hand, in the case where the blur size S2 is input by the user 6, a highly-reliable blur size S2 based on a visual check by the user 6 can be acquired.

It is assumed that, by the input by the user 6 or use of the spot size, the blur size S2 is acquired before the blur shape 25 is created. In this case, the frame image 21 shown in FIGS. 8A and 8B may be displayed as an image that indicates the blur size S2, for example. Further, the reference image 22 may be displayed as an image that indicates the blur-less representative pixels 16d.

Figure 11:
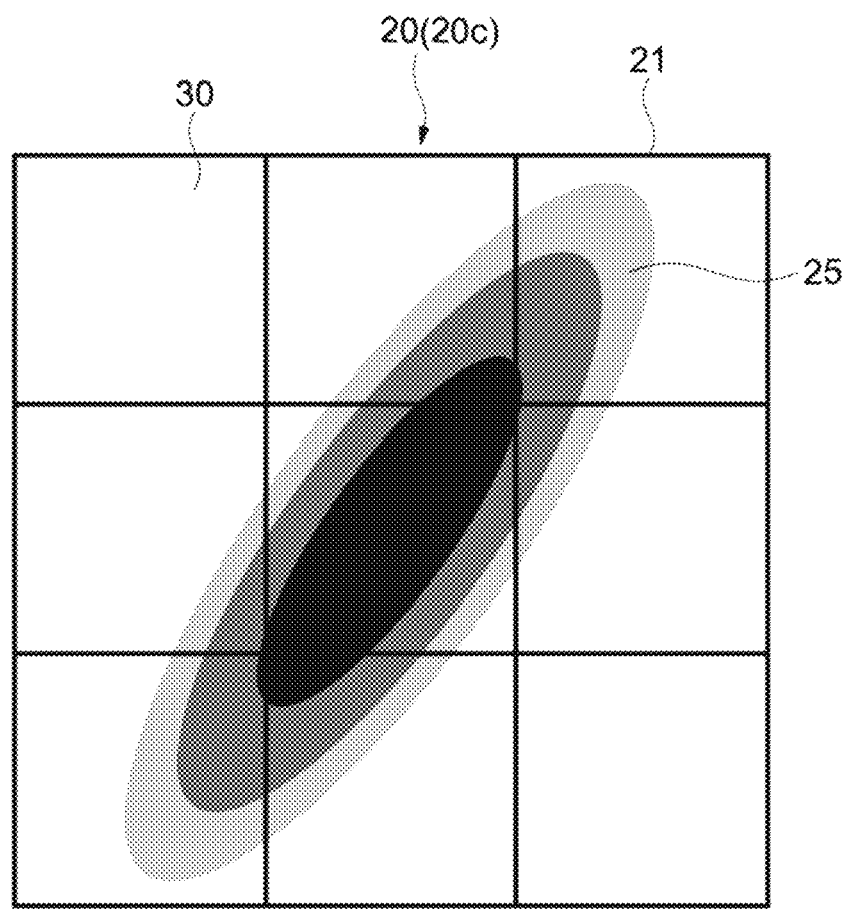
FIG. 11 A schematic diagram showing another configuration example of the GUI for reproducing a blur degree.

Further, as shown in FIG. 11, a 1-dot image 20c divided into the representative pixel areas 30 in a size corresponding to 1 dot of the representative pixels 16d in a state where a blur is not caused in the area of the frame image 21 may be displayed. By displaying these images together with a text image to that effect, the user 6 can highly accurately create the blur shape 25 with favorable operability.

On the other hand, in a case where the blur size S2 is not acquired, the reference image 22 may be presented to the user 6 as the blur-less representative pixel 16d. Then, the user 6 may be requested to create the blur shape 25 by deforming the reference image 22. For example, the user 6 creates the blur shape 25 so as to form a shape of the PSF calculation target representative pixels 16d while assuming the reference image 22 as the representative pixels 16f in the focus area F. The PC 200 can calculate the blur size S2 by dividing the size of the created blur shape 25 (e.g., size of rectangular area where line from a center to farthest pixel is half the diagonal line) by the size of the reference image 22 that has been presented first.

In addition, arbitrary methods may be used as the method of calculating the blur size S2. For example, an image indicating the size S1 of the blur-less representative pixel 16d may be drawn at a center portion of the created blur shape 25. Alternatively, the blur size S2 may be calculated by a feedback of a result of the correction executed by a once-estimated PSF.

Figure 12:
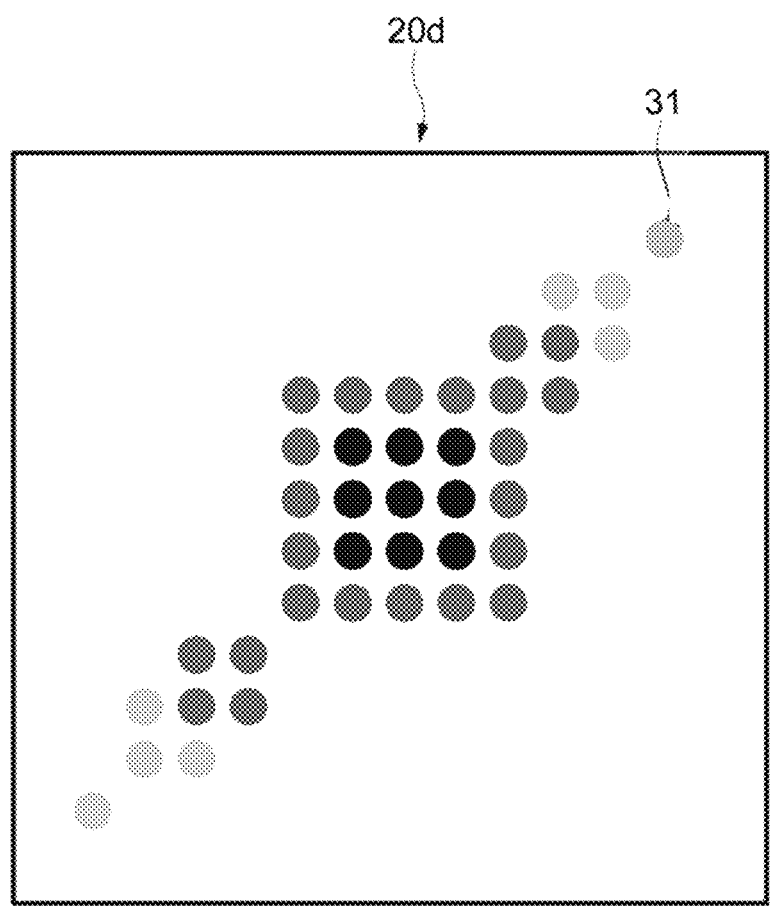
FIG. 12 A schematic diagram showing another configuration example of the GUI for reproducing a blur degree.

Further, an arbitrary GUI may be used as appropriate as a GUI for creating the blur shape 25 or inputting the blur size S2. For example, as shown in FIG. 12, a GUI 20d in which a predetermined pixel group 31 becomes a shape creation unit may be displayed. By selecting a pixel value for each of the pixel groups 31, luminance of light from the projection surface 5 can be reproduced.

Referring back to FIG. 5, a judgment is made on whether to reproduce a blur degree of other representative pixels 16 (Step 206). For example, in a case where there are representative pixels 16 for which reproduction of a blur degree has not yet been executed, the processing returns to Step 202 from Yes in Step 206. In a case where the input of a blur degree is completed for all of the representative pixels 16, the processing advances to Step 207 from No in Step 206. Of course, the judgment of Step 206 may be executed in accordance with an operation of the user 6.

As the PSF is calculated for each of the representative pixels 16, a judgment is made on whether to execute PSF interpolation (Step 207). In a case where the judgment result is Yes, the PSF interpolation is executed (Step 208), and a PSF map as the PSF for each of the pixels of the image 1 to be projected is calculated (Step 209). In a case where the judgment of Step 207 is No, the PSF map is calculated (Step 209) without executing the PSF interpolation.

Figure 13:
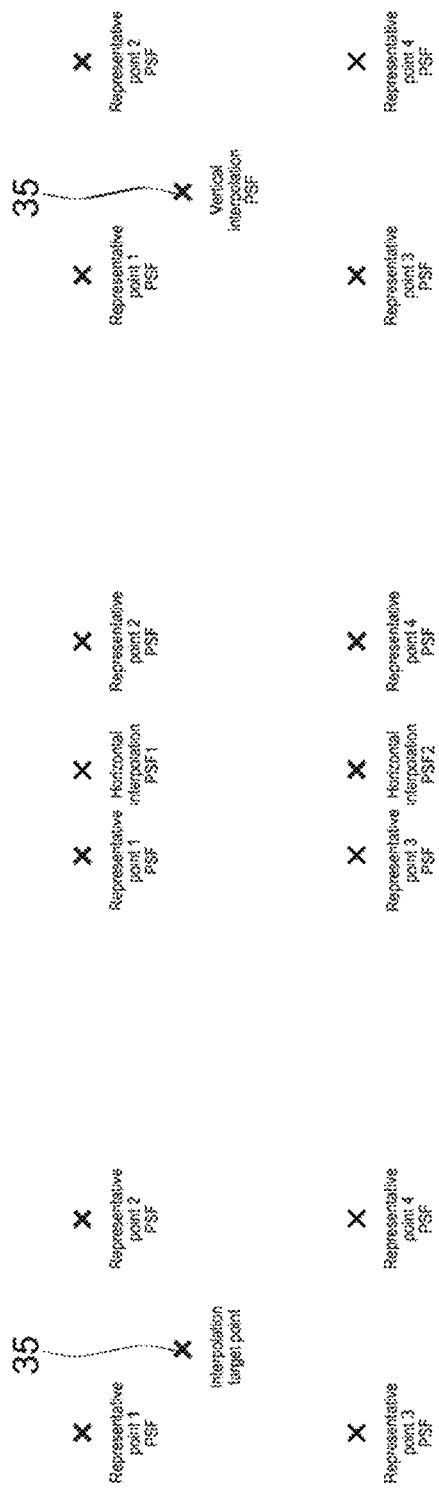
FIGS. 13A, 13B and 13C Diagrams for explaining a PSF interpolation processing example.

FIGS. 13A, 13B and 13C are diagrams for explaining a PSF interpolation processing example. For example, it is assumed that a PSF of each of representative points 1 to 4 as the representative pixels 16 is calculated as shown in FIG. 13A. It is assumed that a PSF of a pixel within an area surrounded by these representative points 1 to 4 (interpolation target point 35) is calculated by interpolation.

For example, a PSFga of the representative point 1 whose coordinate position is closest to the interpolation target point 35 may be set as the PSF of the interpolation target point 35. Accordingly, it becomes possible to easily interpolate PSFs.

As shown in FIGS. 13B and 13C, the PSFs of the representative points 1 to 4 may be subjected to mixing in accordance with coordinate values. For example, as shown in FIG. 13B, the PSFs of the representative points 1 and 2 are subjected to mixing on the basis of coordinate values in a horizontal direction, to thus calculate a horizontal interpolation PSF1. Similarly, the PSFs of the representative points 3 and 4 are subjected to mixing on the basis of coordinate values in the horizontal direction, to thus calculate a horizontal interpolation PSF2.

Next, as shown in FIG. 13C, the horizontal interpolation PSF1 and horizontal interpolation PSF2 are subjected to mixing on the basis of coordinate values in a vertical direction, to thus calculate a vertical interpolation PSF. The vertical interpolation PSF becomes the PSF of the interpolation target point 35. By executing mixing, it becomes possible to calculate a highly-accurate PSF map. It should be noted that the PSF interpolation method is not limited, and other methods may be used instead.

The PSF map calculated by the PC 200 is output to the projector 100 and stored in the memory or the like. For example, the display control unit 140 or the like of the projector 100 functions as the correction unit and corrects input image information on the basis of the stored PSF map. As a result, it becomes possible to project a high-quality image.

It is also possible for the image information to be input to the PC 200 and corrected by the CPU 201 that functions as the correction unit. The corrected image information is output to and projected by the projector 100. Also by such processing, the projection of a high-quality image is realized.

Second Embodiment

An information processing apparatus according to a second embodiment of the present technology will be described. In descriptions below, descriptions on configurations and operations that are similar to those of the PC 200 described in the embodiment above will be omitted or simplified.

Figure 14:
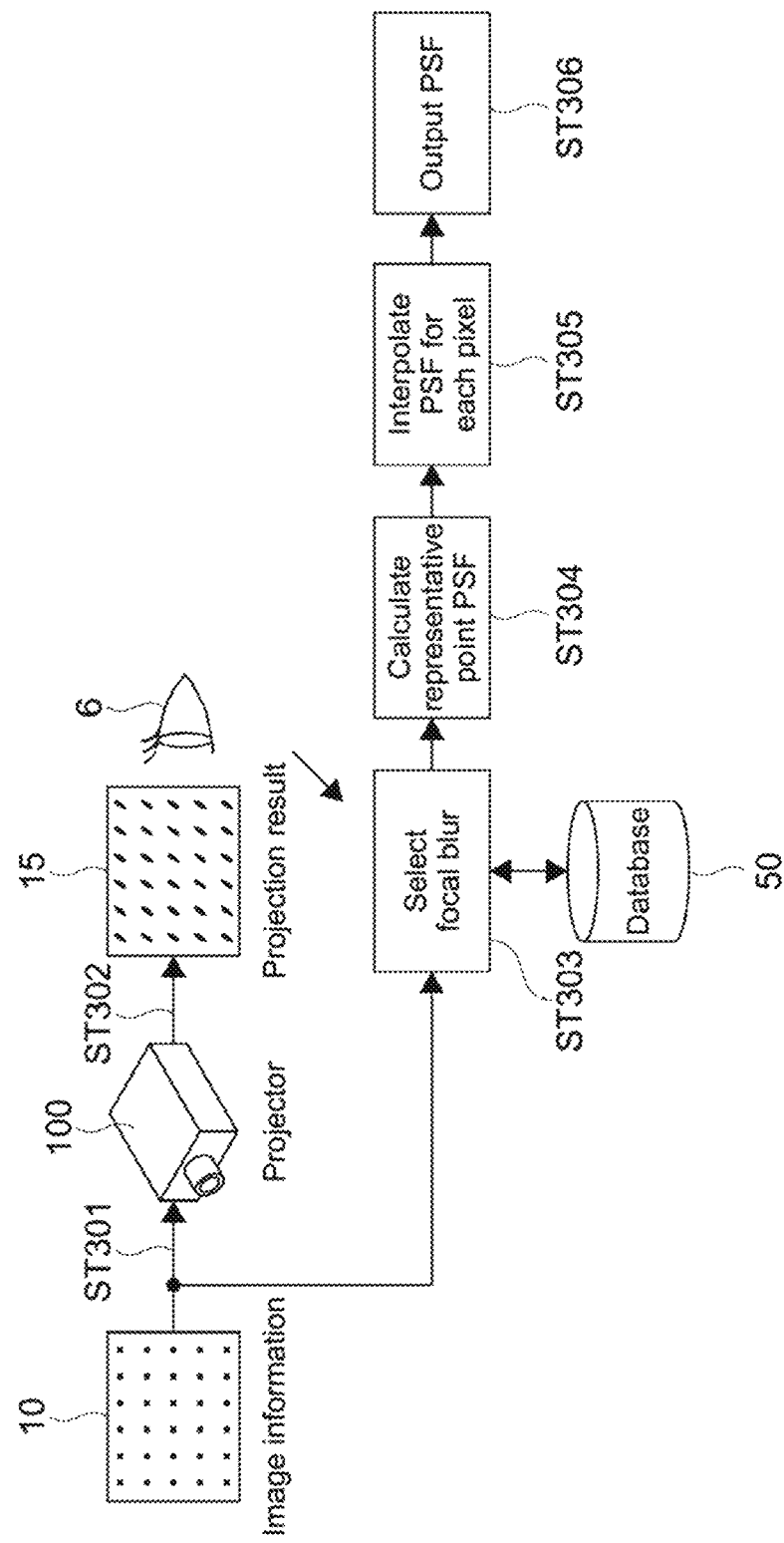
FIG. 14 A block diagram showing a PSF calculation example according to a second embodiment.

FIG. 14 is a block diagram showing a PSF calculation example according to this embodiment. A 1-dot pattern correction image 15 is projected in Steps 301 and 302. In this embodiment, a plurality of candidate images to be candidates of a blur shape are displayed as GUIs for inputting blur degrees of the respective one or more representative pixels 16 in the correction image 15.

Figure 15:
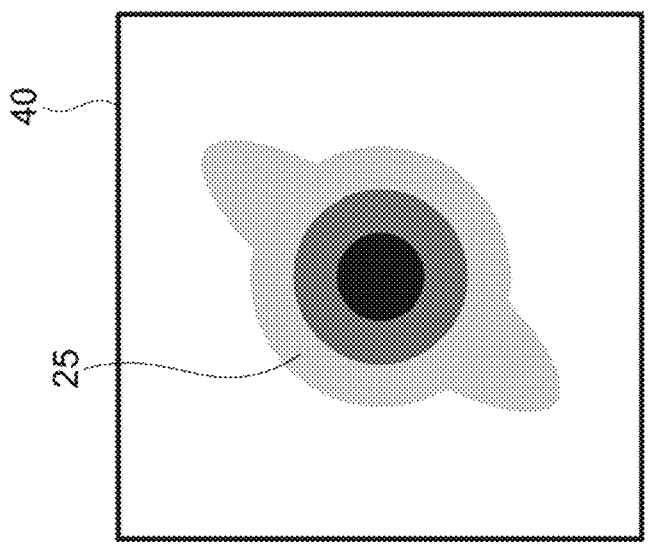
FIGS. 15A, 15B and 15C Schematic diagrams showing configuration examples of a plurality of candidate images.
Figure 15:
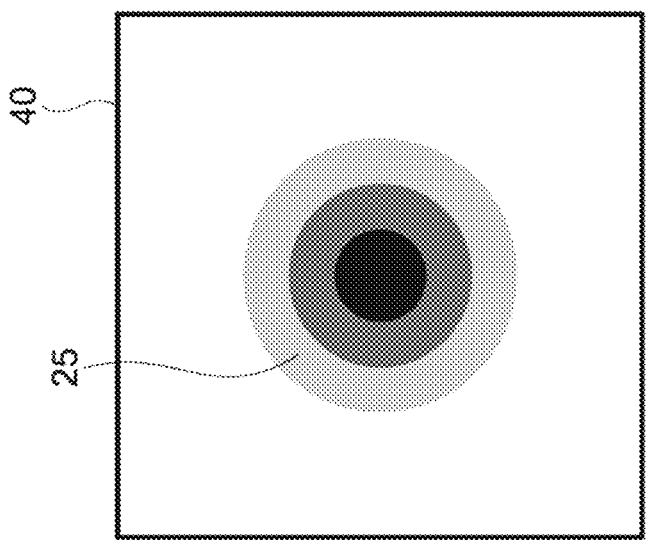
Figure 15:
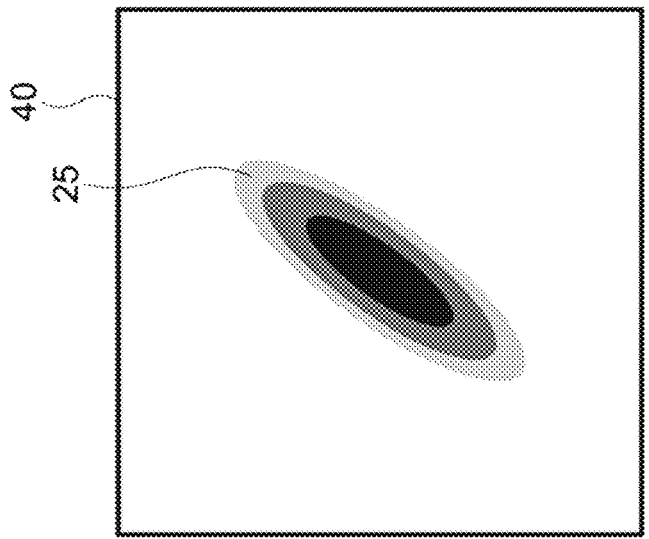

FIGS. 15A, 15B and 15C are schematic diagrams showing configuration examples of the plurality of candidate images. For example, candidate images 40 as shown in FIGS. 15A, 15B and 15C are stored in a database 50 and read out as appropriate. Which images expressing what shapes are to be prepared as the candidate images 40 is not limited. For example, shapes highly likely to become the blur shape 25 are created as the plurality of candidate images 40 on the basis of the spot diagram. Of course, images that have the same outer shape but different blur sizes may also be prepared as the candidate images 40.

The user 6 selects a candidate image 40 having a closest shape (including blur size) out of the plurality of candidate images 40 while visually checking the representative pixels 16 as PSF calculation targets in the correction image 15 (Step 303). On the basis of the selected candidate image 40, the PSF for the representative pixel 14 is calculated (Step 304), and after that, a PSF map is output by processing similar to that of the first embodiment (Steps 305 and 306).

By preparing the plurality of candidate images 40 in advance and causing the user 6 to select the image, the PSF calculation processing is simplified, and a processing time is shortened. Also for the user 6, it becomes possible to easily input a blur degree.

It is also possible for the shape of the selected candidate image 40 to be additionally changeable. Accordingly, an accuracy of the blur degree to be input can be improved, and a PSF calculation accuracy is also improved. The method of changing the shape of the candidate image 40 is not limited, and an arbitrary technology may be used.

Enlarging the blur size of the blur shape 25 corresponds to an input of a fact that a blur intensity is strong in the representative pixel 16. Conversely, reducing the size of the blur shape 25 corresponds to an input of a fact that the blur intensity is weak in the representative pixel 16. On the other hand, the blur intensity corresponds to a correction intensity in the representative pixel 16. Specifically, in a case where the blur intensity is strong, a correction intensity in the inverse filter calculation also becomes strong. In a case where the blur intensity is weak, the correction intensity also becomes weak.

Figure 16:
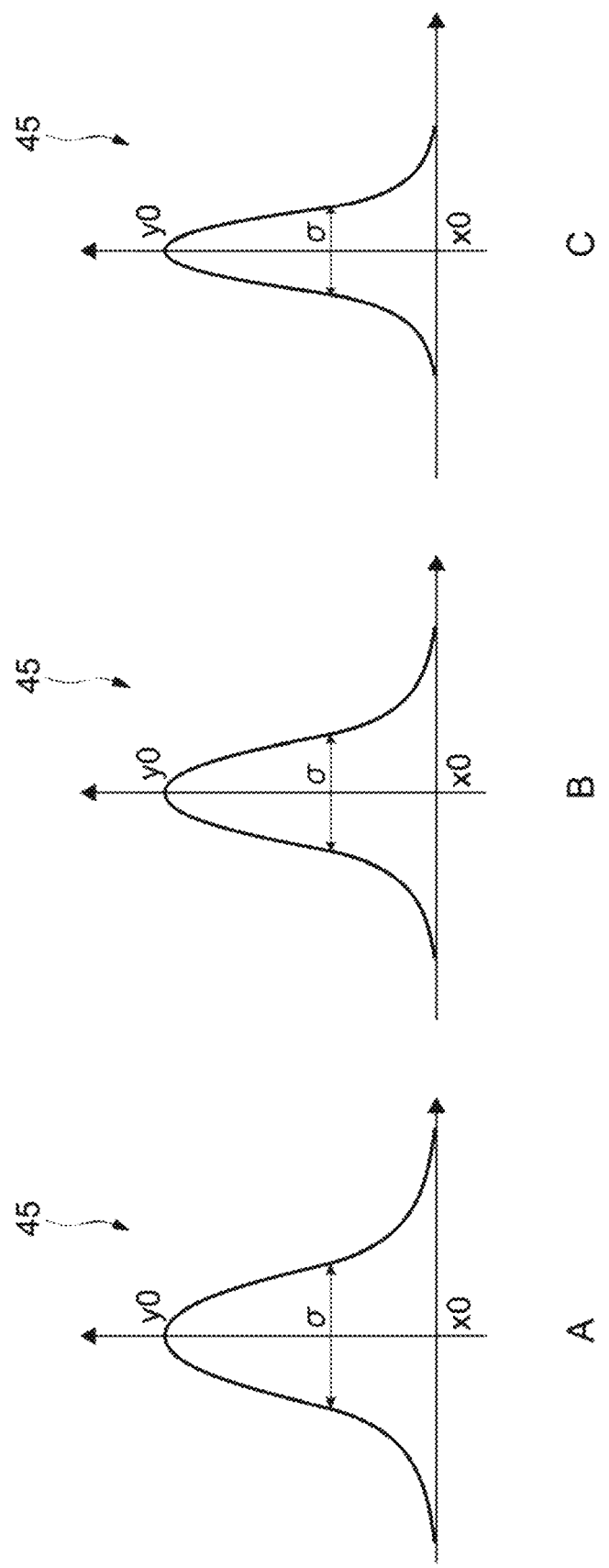
FIGS. 16A, 16B and 16C Diagrams each showing an example of a GUI for changing a blur intensity in a representative pixel.

FIGS. 16A, 16B and 16C are diagrams each showing an example of a GUI for changing a blur intensity (correction intensity) in a representative pixel. As shown in FIGS. 16A, 16B and 16C, a diagram 45 expressing a graph of a Gauss function (hereinafter, referred to as Gauss shape diagram) may be displayed as a diagram for changing the blur intensity. As shown in FIGS. 16A, 16B and 16C, the blur intensity can be adjusted by changing a magnitude of a of the Gauss shape. It should be noted that magnitudes of x0 and y0 may also be changeable. The Gauss shape diagrams 45 shown in FIGS. 16A, 16B and 16C are included in the GUI for inputting a blur degree according to the present technology.

Other Embodiments

The present technology is not limited to the embodiments described above, and various other embodiments can be realized.

Figure 17:
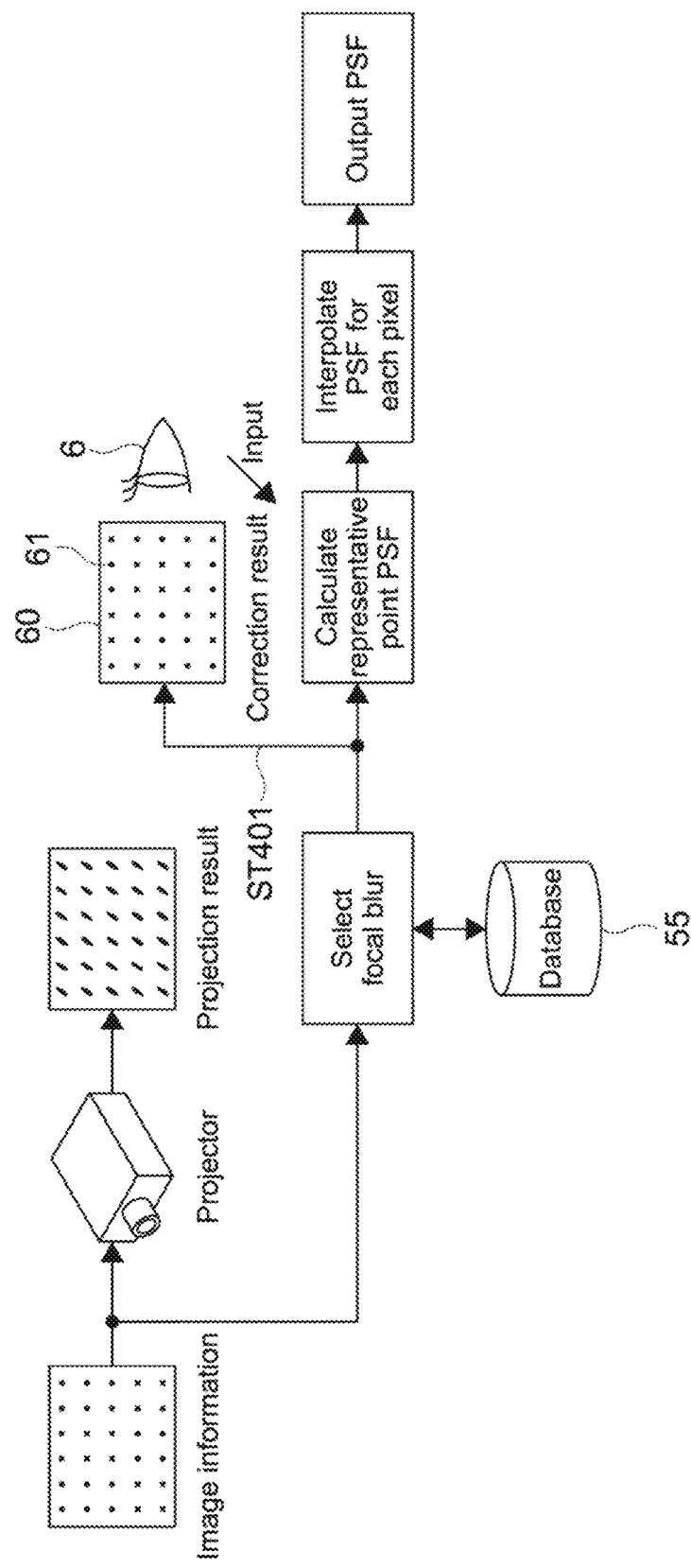
FIG. 17 A block diagram showing a PSF calculation example according to another embodiment.

FIG. 17 is a block diagram showing a PSF calculation example according to another embodiment. In this embodiment, a plurality of PSFs are stored in advance in a database 55. The PC selects a predetermined PSF from the plurality of PSFs and instructs the projector to project a correction image 60 that has been corrected on the basis of the PSF (Step 401).

The user 6 selects a PSF to be actually used while visually checking a representative pixel 61 to become a PSF calculation target in the projected correction image 60. For example, by operating the operation unit of the PC, the PSFs in the database 55 are switched, and a PSF with which a correction is executed with a highest accuracy is selected. It becomes possible to project a high-quality image also in the present technology.

The correction image 60 corrected on the basis of the PSF selected by the PC can also be referred to as preview image. Further, the PSF is information corresponding to a blur degree of each representative pixel 61. Therefore, the preview image is included in the GUI for inputting a blur degree of each of the one or more representative pixels. It should be noted that it is also possible for an intensity of the PSF and the like determined via the preview image to be adjustable by the user 6. In this case, the Gauss shape diagram 45 or the like shown in FIGS. 16A, 16B and 16C or the like may be displayed, for example.

In the embodiment shown in FIG. 17, images other than a 1-dot pattern image may be used as the correction image. Alternatively, it is also possible to use an image to be projected as it is and calculate a PSF on the basis of a preview image thereof. It should be noted that also in other embodiments, images other than a 1-dot pattern image may be used as the correction image.

It is assumed that there is no representative pixel that is being focused out of the representative pixels in the correction image to be projected. Also in this case, it is possible to calculate a PSF according to the present technology using a representative pixel that the user determines as being most focused as a reference. For example, in a case where an image is to be projected with a certain level of quality onto a projection surface having an extremely eccentric shape, and the like, the present technology of calculating a PSF on the basis of a visual check by the user is effective.

It is also possible to subject a result of the corrected representative points to mixing in place of the mixing shown in FIGS. 13B and 13C and calculate it as an interpolation target point correction result.

In the embodiments above, the representative pixel to become a PSF calculation target is selected one by one. The present technology is not limited thereto, and a representative pixel to become a representative may be selected from a plurality of representative pixels within a predetermined range of defocus area. Then, a PSF calculated for the representative pixel to become a representative may be set as a PSF of other representative pixels within the defocus area. In other words, a common PSF may be set for each local point. Accordingly, the processing can be simplified, and a processing time can be shortened.

In the descriptions above, the GUI for inputting a blur degree is displayed on the display unit 206 of the PC 200. The present technology is not limited thereto, and it is also possible to display the GUI for inputting a blur degree on the projection surface 5 and execute creation of the blur shape 25 or the like on the projection surface 5, for example. Although a blur or the like is caused in an image to be projected onto the projection surface 5, by executing creation of the blur shape 25 or the like using an area of a relatively-large size, an influence of the blur or the like can be suppressed. In other words, the PSFs of the respective representative pixels can be calculated with a sufficient accuracy.

Parameters other than the PSF may be used as the method of correcting image information on the basis of a blur degree input via a GUI. In other words, the method of correcting an image on the basis of an input blur degree is not limited, and an arbitrary method may be used.

The various types of processing carried out by the PC 200, that have been described in the embodiments above, may be executed by the projector 100. For example, the display control unit 140 of the projector 100 shown in FIG. 2 may function as the output unit and calculation unit according to the present technology. Accordingly, it becomes possible for the projector 100 to operate as the image display apparatus according to the present technology. It should be noted that the projector 100 also functions as the information processing apparatus according to the present technology.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) An information processing apparatus, including:
a projection instruction unit that instructs a projection of a correction image in which one or more representative pixels are displayed; and
an output unit that outputs a GUI (Graphical User Interface) for inputting a blur degree of each of the one or more representative pixels within the projected correction image.

(2) The information processing apparatus according to (1), further including
a correction unit that corrects an image to be projected on the basis of the blur degree of each of the one or more representative pixels input via the GUI.

(3) The information processing apparatus according to (1) or (2), further including
a calculation unit that calculates a PSF (Point spread function) for each pixel of an image to be projected on the basis of the blur degree of each of the one or more representative pixels input via the GUI.

(4) The information processing apparatus according to any one of (1) to (3), in which
the output unit outputs a GUI capable of creating a shape that expresses the blur degree.

(5) The information processing apparatus according to (4), in which
the calculation unit calculates a PSF for the representative pixel on the basis of the shape expressing the input blur degree and a size of light spread from the representative pixel due to a blur.

(6) The information processing apparatus according to (5), in which
the output unit outputs a frame image indicating the size of light spread from the representative pixel due to the blur such that a shape that expresses the blur degree can be created in the frame image.

(7) The information processing apparatus according to (5) or (6), in which
the output unit outputs a reference image indicating the representative pixel in which a blur is not caused in a state where a shape of the reference image is changeable.

(8) The information processing apparatus according to any one of (5) to (7), in which
the output unit outputs a GUI for inputting the size of light spread from the representative pixel due to the blur.

(9) The information processing apparatus according to any one of (5) to (8), further including
a storage unit that stores a spot diagram of a projection apparatus that projects the correction image,
in which the calculation unit calculates the size of light spread from the representative pixel due to the blur on the basis of the stored spot diagram.

(10) The information processing apparatus according to any one of (4) to (9), in which
the output unit outputs a plurality of candidate shape images to be candidates of the shape that expresses the blur degree.

(11) The information processing apparatus according to (10), in which
the output unit outputs the plurality of candidate shape images in a state where each of the shapes is changeable.

(12) The information processing apparatus according to any one of (3) to (11), in which
the projection instruction unit instructs a projection of an image corrected on the basis of the PSF for each pixel that has been calculated by the calculation unit.

REFERENCE SIGNS LIST

S1 size of representative pixel in state where blur is not caused
S2 blur size
1 projection image
10 correction image (image information)
11 representative pixel of correction image (image information)
15 correction image (projection image)
16 representative pixel of correction image (projection image)
20 GUI capable of creating blur shape
21 frame image
22 reference image
25 blur shape
40 candidate image
60 correction image (corrected)
61 representative pixel of correction image (corrected)
100 projector
200 PC
500 image display system

The invention claimed is:

1. An information processing apparatus, comprising:
a central processing unit (CPU) configured to:
  instruct a projection apparatus to project a correction image, wherein the projected correction image includes a plurality of representative pixels;
  output a text image based on the projection of the correction image;
  select at least one representative pixel of the plurality of representative pixels based on a first user operation on the text image;
  output a Graphical User Interface (GUI) based on the selection of the at least one representative pixel, wherein
    the GUI includes a plurality of candidate shape images, and
    each of the plurality of candidate shape images corresponds to a blur degree of a respective representative pixel of the plurality of representative pixels;
  select at least one candidate shape image of the plurality of candidate shape images based on a second user operation on the GUI;
  one of enlarge or reduce a size of the selected at least one candidate shape image based on a blur intensity of the at least one representative pixel and a third user operation on the GUI, wherein
    the size of the selected at least one candidate shape image is enlarged based on the blur intensity of the at least one representative pixel that is greater than a threshold blur intensity, and
    the size of the selected at least one candidate shape image is reduced based on the blur intensity of the at least one representative pixel that is less than the threshold blur intensity; and
  correct the projected correction image based on one of the enlargement or the reduction of the size of the selected at least one candidate shape image.

2. The information processing apparatus according to claim 1, wherein the CPU is further configured to calculate a Point Spread Function (PSF) for each of the plurality of representative pixels based on the blur degree of each of the plurality of representative pixels.

3. The information processing apparatus according to claim 2, wherein the CPU is further configured to instruct the projection apparatus to project the corrected correction image based on the calculated PSF for each of the plurality of representative pixels.

4. The information processing apparatus according to claim 1, wherein
the CPU is further configured to create a shape on the GUI, and
the shape expresses the blur degree.

5. The information processing apparatus according to claim 4, wherein the CPU is further configured to calculate a Point Spread Function (PSF) for the respective representative pixel of the plurality of representative pixels based on the shape that expresses the blur degree and a size of light spread from the respective representative pixel due to a blur.

6. The information processing apparatus according to claim 5, wherein
the CPU is further configured to output a frame image, and
the frame image indicates the size of light spread from the respective representative pixel due to the blur.

7. The information processing apparatus according to claim 5, wherein
the CPU is further configured to output a reference image, and
the reference image indicates a blur-less representative pixel in a state where a shape of the reference image is changeable.

8. The information processing apparatus according to claim 5, wherein the CPU is further configured to receive, via the GUI, an input of the size of light spread from the respective representative pixel due to the blur.

9. The information processing apparatus according to claim 5, further comprising a memory,
wherein the CPU is further configured to:
  control the memory to store a spot diagram of the projection apparatus; and
  calculate, based on the spot diagram, the size of light spread from the respective representative pixel due to the blur.

10. The information processing apparatus according to claim 4, wherein the at least one candidate shape image is a candidate of the shape that expresses the blur degree.

11. The information processing apparatus according to claim 10, wherein the shape is changeable.

12. An information processing method, comprising:
instructing a projection apparatus to project a correction image, wherein the projected correction image includes a plurality of representative pixels;
outputting a text image based on the projection of the correction image;
selecting at least one representative pixel of the plurality of representative pixels based on a first user operation on the text image;
outputting a Graphical User Interface (GUI) based on the selection of the at least one representative pixel, wherein
  the GUI includes a plurality of candidate shape images, and each of the plurality of candidate shape images corresponds to a blur degree of a respective representative pixel of the plurality of representative pixels;

selecting at least one candidate shape image of the plurality of candidate shape images based on a second user operation on the GUI;

one of enlarging or reducing a size of the selected at least one candidate shape image based on a blur intensity of the at least one representative pixel and a third user operation on the GUI, wherein the size of the selected at least one candidate shape image is enlarged based on the blur intensity of the at least one representative pixel that is greater than a threshold blur intensity, and the size of the selected at least one candidate shape image is reduced based on the blur intensity of the at least one representative pixel that is less than the threshold blur intensity; and correcting the projected correction image based on one of the enlargement or the reduction of the size of the selected at least one candidate shape image.

13. A non-transitory computer-readable medium having stored thereon computer-executable instructions, which when executed by a processor, cause the processor to execute operations, the operations comprising:

instructing a projection apparatus to project a correction image, wherein the projected correction image includes a plurality of representative pixels;

outputting a text image based on the projection of the correction image;

selecting at least one representative pixel of the plurality of representative pixels based on a first user operation on the text image;

outputting a Graphical User Interface (GUI) based on the selection of the at least one representative pixel, wherein the GUI includes a plurality of candidate shape images, and each of the plurality of candidate shape images corresponds to a blur degree of a respective representative pixel of the plurality of representative pixels;

selecting at least one candidate shape image of the plurality of candidate shape images based on a second user operation on the GUI;

one of enlarging or reducing a size of the selected at least one candidate shape image based on a blur intensity of the at least one representative pixel and a third user operation on the GUI, wherein the size of the selected at least one candidate shape image is enlarged based on the blur intensity of the at least one representative pixel that is greater than a threshold blur intensity, and the size of the selected at least one candidate shape image is reduced based on the blur intensity of the at least one representative pixel that is less than the threshold blur intensity; and correcting the projected correction image based on one of the enlargement or the reduction of the size of the selected at least one candidate shape image.

14. An image display apparatus, comprising:

a projector; and a central processing unit (CPU) configured to:

receive image information;

generate an image based on the image information;

instruct the projector to project the image, wherein the projected image includes a plurality of representative pixels;

output a text image based on the projection of the image;

select at least one representative pixel of the plurality of representative pixels based on a first user operation on the text image;

output a Graphical User Interface (GUI) based on the selection of the at least one representative pixel, wherein the GUI includes a plurality of candidate shape images, and each of the plurality of candidate shape images corresponds to a blur degree of a respective representative pixel of the plurality of representative pixels;

select at least one candidate shape image of the plurality of candidate shape images based on a second user operation on the GUI;

one of enlarge or reduce a size of the selected at least one candidate shape image based on a blur intensity of the at least one representative pixel and a third user operation on the GUI, wherein the size of the selected at least one candidate shape image is enlarged based on the blur intensity of the at least one representative pixel that is greater than a threshold blur intensity, and the size of the selected at least one candidate shape image is reduced based on the blur intensity of the at least one representative pixel that is less than the threshold blur intensity; and correct the image information based on one of the enlargement or the reduction of the size of the selected at least one candidate shape image.

* * * * *